United States Patent [19]
Hehl

[11] Patent Number: 5,129,806
[45] Date of Patent: Jul. 14, 1992

[54] HYDRAULIC SYSTEM IN AN INJECTION MOLDING MACHINE

[76] Inventor: Karl Hehl, Arthur-Hehl-Str. 32, D-7298 Lossburg 1, Fed. Rep. of Germany

[21] Appl. No.: 711,986

[22] Filed: Jun. 7, 1991

[30] Foreign Application Priority Data

Jun. 8, 1990 [DE] Fed. Rep. of Germany ....... 4018334

[51] Int. Cl.⁵ .................. B29C 45/68; B29C 45/76; B29C 45/82
[52] U.S. Cl. ................. 425/135; 425/450.1; 425/451.2; 425/590; 425/595
[58] Field of Search ........... 425/450.1, 451.2, 589, 425/590, 595, 135, 149

[56] References Cited

U.S. PATENT DOCUMENTS

| | | | |
|---|---|---|---|
| 3,677,685 | 7/1972 | Aoki | 425/451.2 |
| 4,380,427 | 4/1983 | Hehl | 425/590 |
| 4,565,116 | 1/1986 | Hehl | 425/451.2 |
| 4,846,664 | 7/1989 | Hehl | |
| 4,981,426 | 1/1991 | Aoki | 425/451.2 |
| 5,052,910 | 10/1991 | Hehl | 425/595 |

FOREIGN PATENT DOCUMENTS

3844432 1/1988 Fed. Rep. of Germany .
3644181 4/1988 Fed. Rep. of Germany .

Primary Examiner—Willard Hoag
Attorney, Agent, or Firm—Spencer, Frank & Schneider

[57] ABSTRACT

The hydraulic system comprises a 4/4-way valve, which is adapted to control the velocity of the mold-closing operation and the fluid pressure during said mold-closing movement and to assume three consecutive control position, in each of which fluid pressure is applied to a stationary piston of an advance-retract cylinder from a first cylinder chamber, which is nearer to the mold. One of said control positions is a differential control position, in which pressure fluid displaced from the second cylinder chamber of said advance-retract cylinder, which second chamber is remote from the mold, is supplied to a pressure conduit through a branch passage, which includes a non-return valve. The differential control position is preceded and succeeded by a transitional control position, in which the pressure fluid displaced from the second cylinder chamber is returned through the 4/4-way valve to a reservoir. As a result of that arrangement the production rate of the injection molding machine can considerably be increased whereas only gradual velocity and pressure chambers are effected during the mold-closing movement.

6 Claims, 6 Drawing Sheets

HYDRAULIC SYSTEM IN AN INJECTION MOLDING MACHINE

BACKGROUND OF THE INVENTION

1. Field of the Invention

This invention relates to a hydraulic system comprising a hydraulic pump and a directional control valve and combined with a clamping unit for use in an injection molding machine, which clamping unit and hydraulic system comprise at least one hydraulic locking cylinder for generating the locking pressure for locking the injection mold, in which cylinder a piston defines cylinder chambers, which are adapted to communicate with each other through valve-controlled transfer passages of the piston, also comprise at least one hydraulic advance-retract cylinder, which contains a stationary piston and serves to close and open the injection mold and the movement of which is adapted to be controlled by means of a displacement-voltage converter and the directional control valve in conjunction with a control of the pressure on both sides of the stationary piston and in accordance with a fluid volume program with a superimposed automatic pressure control, and comprise at least one compensating cylinder, which is in open communication with the low-pressure chamber, wherein pressure sensors are provided in the communicating passages leading to the cylinder chambers of said advance-retract cylinder, which communicating passages communicate through branch passages to the high-pressure chamber and the low-pressure chamber, said branch passages are controlled by respective shut-off valves, and the pistons in the locking cylinder and the compensating cylinder are connected by associated piston rods to a movable mold carrier.

2. Description of the Prior Art

A hydraulic system of that kind is known from U.S. Pat. No. 4,846,664 and U.S application Ser. No. 07/450,258 and is operable to close an injection mold in that the mold-site cylinder chamber of the advance-retract cylinder is supplied via the control valve with a fluid under pressure, a superimposed automatic pressure control is effected by means of a pressure sensor. During the mold-closing movement, fluid is displaced from the rear cylinder chamber of the advance-retract cylinder and through a line provided with a pressure sensor for a superimposed automatic pressure control and through the directional control valve flows to the reservoir. Owing to the differential surfaces of the locking cylinder and of the compensating cylinder a small amount of pressure fluid is released during the mold-closing operation and that pressure fluid flows from the high-pressure chamber of the locking cylinder directly to the reservoir to effect a temperature compensation.

SUMMARY OF THE INVENTION

It is an object of the invention to provide for use in an injection molding machine a clamping unit and hydraulic system which are of the kind described first hereinbefore and which are so improved that the production rate of the injection molding machine can substantially be increased whereas the movement of the mold carrier will be accompanied by only gradual velocity and pressure changes.

This object is accomplished in that the velocity and pressure changes occurring during the closing movement of the injection mold are adapted to be controlled by means of a 4/4-way valve in three consecutive control positions, in which pressure is applied from the mold-side cylinder chamber of the advance-retract cylinder to the stationary piston of said advance-retract cylinder, and the velocity and pressure are controlled during a major part of the mold-closing movement by the 4/4-way valve in a differential control position, in which pressure fluid is displaced from the rear cylinder chamber of the advance-retract cylinder and through a branch passage, which by-passes the 4/4-way valve and is provided with a non-return valve, is adapted to flow into the pressure line, and the differential control position is preceded and succeeded by the 4/4-way valve in a transitional control position, in which the pressure fluid being displaced from the rear cylinder chamber of the advance-retract cylinder is caused to flow through the valve passage and the 4/4-way valve into the reservoir.

In that case the closing movement of the clamping unit will be performed at a higher velocity. The control of the velocity and pressure during that operation can be more closely adapted to the requirements to be met in each case from the aspects of mechanical engineering and of injection molding technology. At the beginning of the mold-closing movement, the pressure applied to the stationary differential piston in the advance-retract cylinder will be controlled on both sides of said piston and pressure fluid will be supplied to said piston on one side thereof so that the accelerating force can be increased in case of need until a predetermined desired velocity has been reached (transitional valve position shown in FIG. 3). As the 4/4-way valve is moved to its next control position a stepless transition will be effected from the direct supply of pressure fluid to the piston (transitional control position shown in FIG. 3) to the differential control position shown in FIG. 4. When the movement of the spool of the 4/4-way valve is continued in the first part of the time in which that transitional control position is maintained, pressure fluid at a higher rate flows back to the reservoir from the rear cylinder chamber 80 of the advance-retract cylinder through the flow path from port 'B' to port'T' of the 4/4-way valve and pressure fluid at a lower rate is still supplied through the non-return valve 83' in the pressure line 84 to the forward cylinder chamber 48 of the advance-retract cylinder. As the spool of the 4/4-way valve continues its movement toward the differential control position shown in FIG. 4, the rate at which returning pressure fluid flows from port 'B' to port 'T' progressively decreases and the rate at which pressure fluid flows through the non-return valve 83' to the pressure line 84 progressively increases. When the differential control position has been reached there is no longer a flow of pressure fluid via ports 'B' and 'T' of the 4/4-way valve back to the reservoir 71 but all pressure fluid displaced out of the rear cylinder chamber 80 of the advance-retract cylinder is supplied through the non-return valve 83' of the branch line 83 to the pressure line 84. When the 4/4-way valve is fully in its differential control position the mold-closing movement has been accelerated to the maximum velocity. In order to prevent a hard striking of the parts of the injecting mold on each other at the end of the closing movement, the 4/4-way valve is moved from the differential control position to the transitional control position and this is usually effected in the same manner as for the gradual transition from the initial transitional control position (FIG. 3) to the differential control position (FIG. 4)

with an approximately stepless change of the flow area of the passages in the 4/4-way valve.

Within the scope of the invention it is possible to ensure that a stepless change can be effected during the final phase of the mold-closing movement (transitional control position of FIG. 3) to a slowed-down movement, which is automatically controlled by means of a pressure sensor (final control position of FIG. 5). In that final position the high-pressure chamber of the locking cylinder has already been controlled to maintain the 'locking pressure'. As a result, the injection mold is closed by a continued steady movement almost without a shake.

The design in accordance with the invention also permits an opening of the injection mold by a strong force (mold-opening movement in the position shown in FIG. 6) under automatic pressure control and in adaptation to the requirements in any given case.

Experiments have revealed that in the differential control position the mold-closing movement can be performed at a velocity of about 900 mm/s whereas a velocity of only about 600 mm/s could be achieved in the previously conventional mold-closing operation. If it is assumed that an injection molding cycle takes 5 to 10 seconds the time required for each injection molding cycle may be decreased by as much as 10% and this will be of high significance in the continuous operation of an injection molding machine performing a very large number of injection molding cycles.

As a result, the injection molding cycles are performed almost without any shake and in spite of a higher rate of molding cycles the critical mechanical stresses on delicate parts of the machine will be decreased. The hydraulic system can be used independently of the number of locking cylinders and compensating cylinders and of the arrangement of such cylinders.

DETAILED DESCRIPTION OF THE PREFERRED EMBODIMENTS

Figure 1:
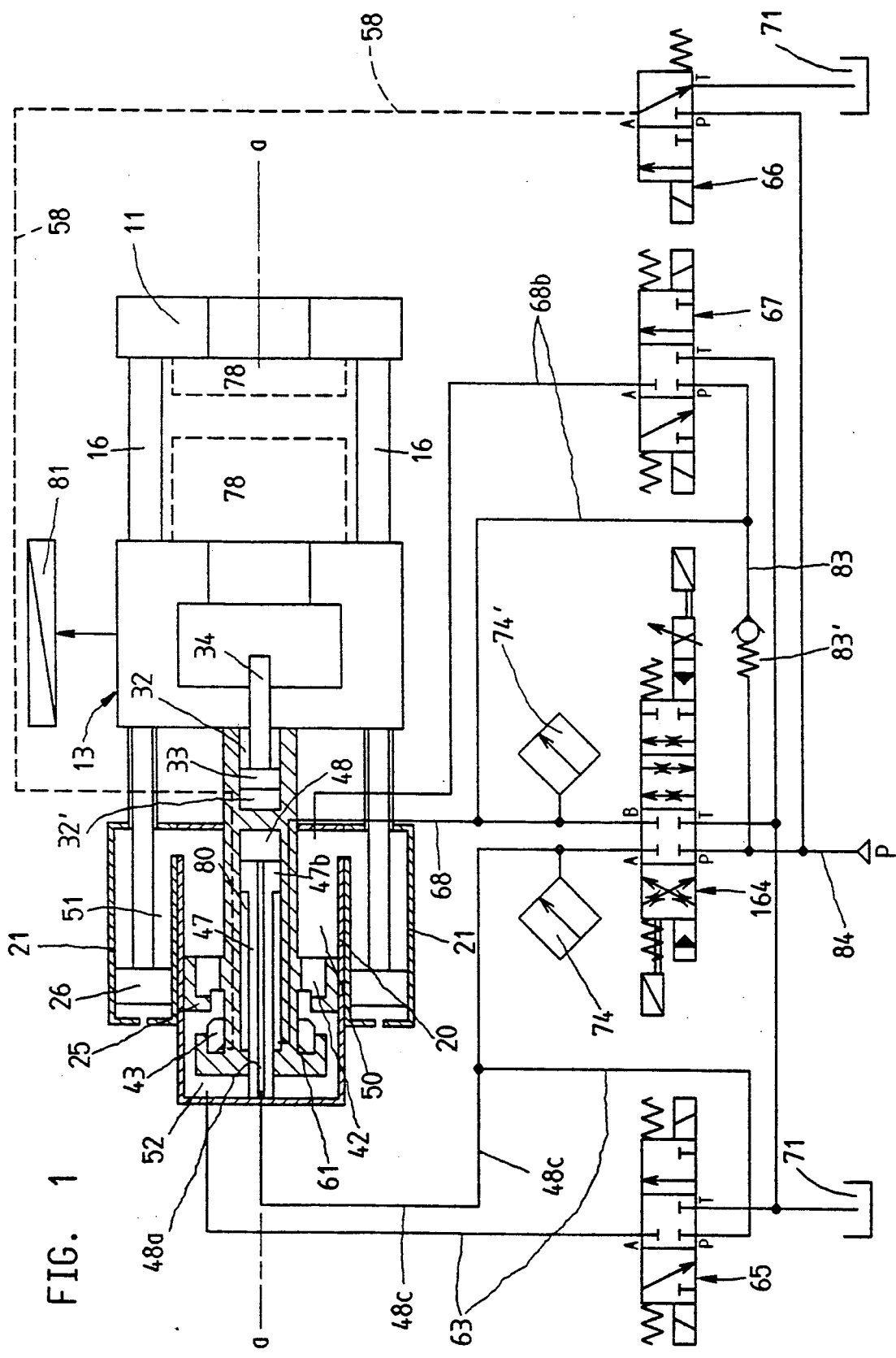
FIGS. 1 and 2 are general circuit diagrams of hydraulic systems associated with clamping units differing in the number and arrangement of the cylinders.
Figure 2:
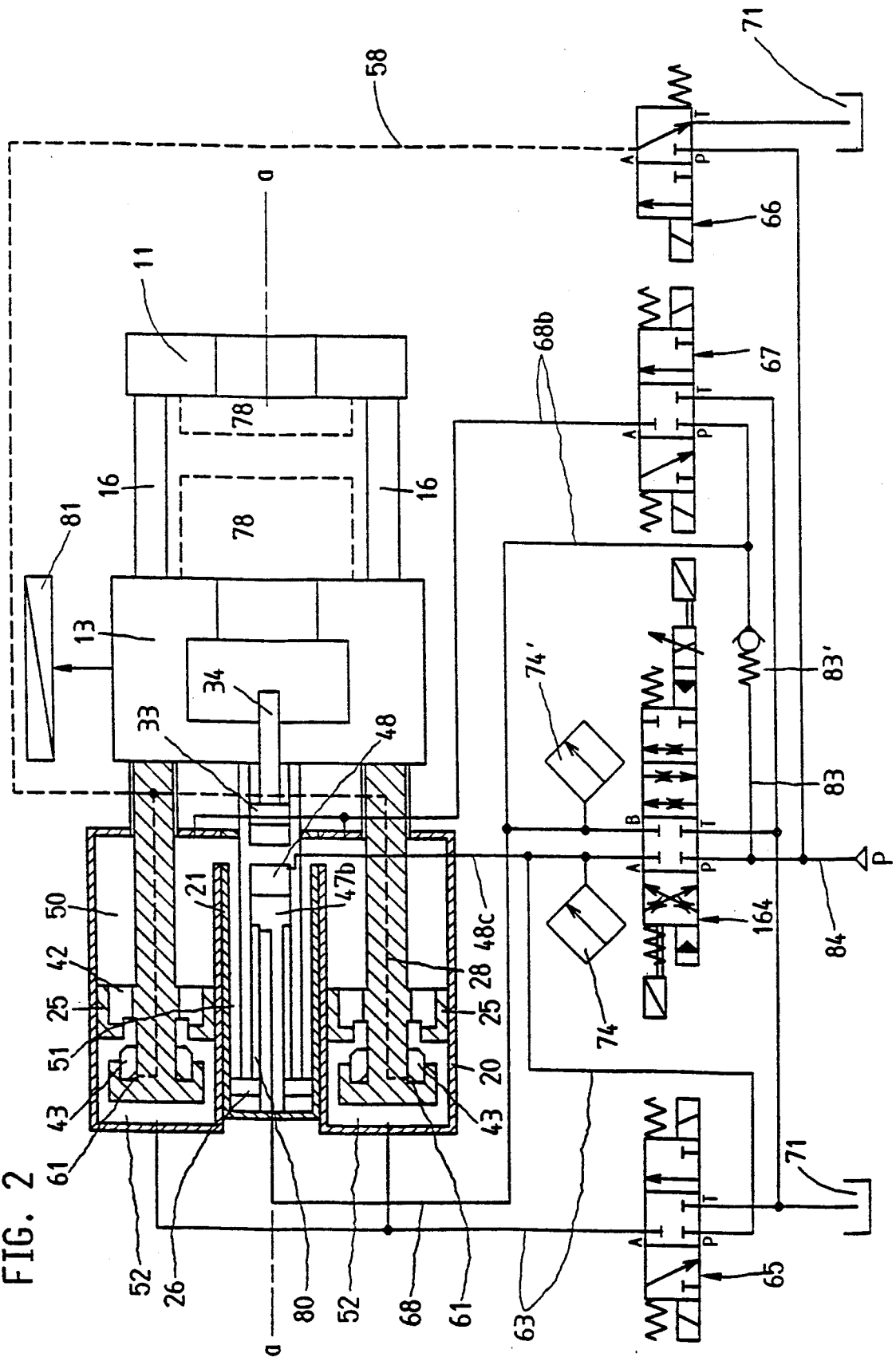

FIGS. 1 and 2 are general circuit diagrams of hydraulic systems for clamping units which differ in the number and arrangement of their locking and compensating cylinders.

FIGS. 3 to 6 show the hydraulic system in different control positions assumed when the injection mold is being closed, locked and opened. In each of FIGS. 3 to 6 only those parts of the hydraulic system are shown which are employed in the respective operation and the pressure lines leading to the various cylinder chambers are represented by solid lines and the lines for returning the fluid to the reservoir are represented by dotted lines.

The design of the clamping unit and of the associated hydraulic system is best apparent from FIGS. 1 and 2: A stationary mold carrier 11 is secured to the pedestal of an injection molding machine. The movable mold carrier 13 is slidably mounted on horizontal rods 16. The clamping unit and hydraulic system comprise a hydraulic pump P and an automatically controlled directional control valve 164, at least one hydraulic locking cylinder 20 for generating the pressure for locking the injection mold 78, at least one hydraulic advance-retract cylinder, which contains a piston 47b, and at least one single-acting compensating cylinder. In the locking cylinder 20 a piston 25 defines two cylinder chambers, namely, a high-pressure chamber 52 and a low-pressure chamber 50, between which a communication can be established through controllable tranfer passages 42, which can be opened and closed by means of an annular piston 43, to which pressure fluid can be supplied from a cylinder chamber 61. The cylinder chamber 61 is connected to the reservoir 71 by a line 58, which is controlled by a directional control valve 66. A hydraulic advance-retract cylinder is centered on the axis a—a of the clamping unit and contains a stationary piston 47b and is operable to close and open the injection mold 78. That advance-retract cylinder is constituted in the embodiment shown in FIG. 1 by the piston rod of the piston 25 of the locking cylinder and in the embodiment shown in FIG. 2 by the piston rod of the piston 26 contained in the compensating cylinder. The embodiment shown in FIG., 1 comprises a single locking cylinder 20, which is coaxial to the central advance-retract cylinder, and two compensating cylinders 21, which are diametrically opposite to each other on opposite sides of the locking cylinder 20. The embodiment shown in FIG. 2 comprises a single compensating cylinder 21, which is coaxial to the central advance-retract cylinder, and two locking cylinders 20, which are diametrically opposite to each other and disposed on opposite sides of the compensating cylinder 21. The hydraulic advance-retract cylinder which contains the stationary piston 47b, is operable to close and open the injection mold 78 under the control of a displacement-voltage converter 81 and of the 4/4-way valve 164 while the fluid pressure applied to the piston 47b on opposite sides thereof is controlled in accordance with a volume program. The cylinder chamber 51 of the or each compensating cylinder 21 communicates freely with an associated low-pressure chamber 50. A pressure sensor 74 or 74' is provided in each of the communicating passages 48c; 68, which lead from the directional control valve 164 to the cylinder chambers 48 and 80 of the advance-retract cylinder. Said communicating passages 48c and 68 are connected by branch passages 63; 68b to the high-pressure chamber 52 and the low-pressure chamber 50. Each of said branch passages 63, 68b is controlled by a shut-off valve 65 or 67. The pistons 25 and 26 in the locking cylinder 20 and in the compensating cylinder are connected by associated piston rods to the movable mold carrier 13.

The hydraulic system comprises a 4/4-way valve, which may consist of a proportional-action valve providing for a zero overlap and effecting a stepless change of its flow area as it is moved from one control position to another.

By a branch line 83, which is provided with a non-return valve 83', the branch line 68b is connected to that portion 84 of the pressure line which leads from the variable capacity pump P to the 4/4-way valve.

In all control positions assumed during the mold-closing movement the stationary piston 47b of the advance-retract cylinder is subjected to pressure from the forward cylinder chamber 48.

Figure 3:
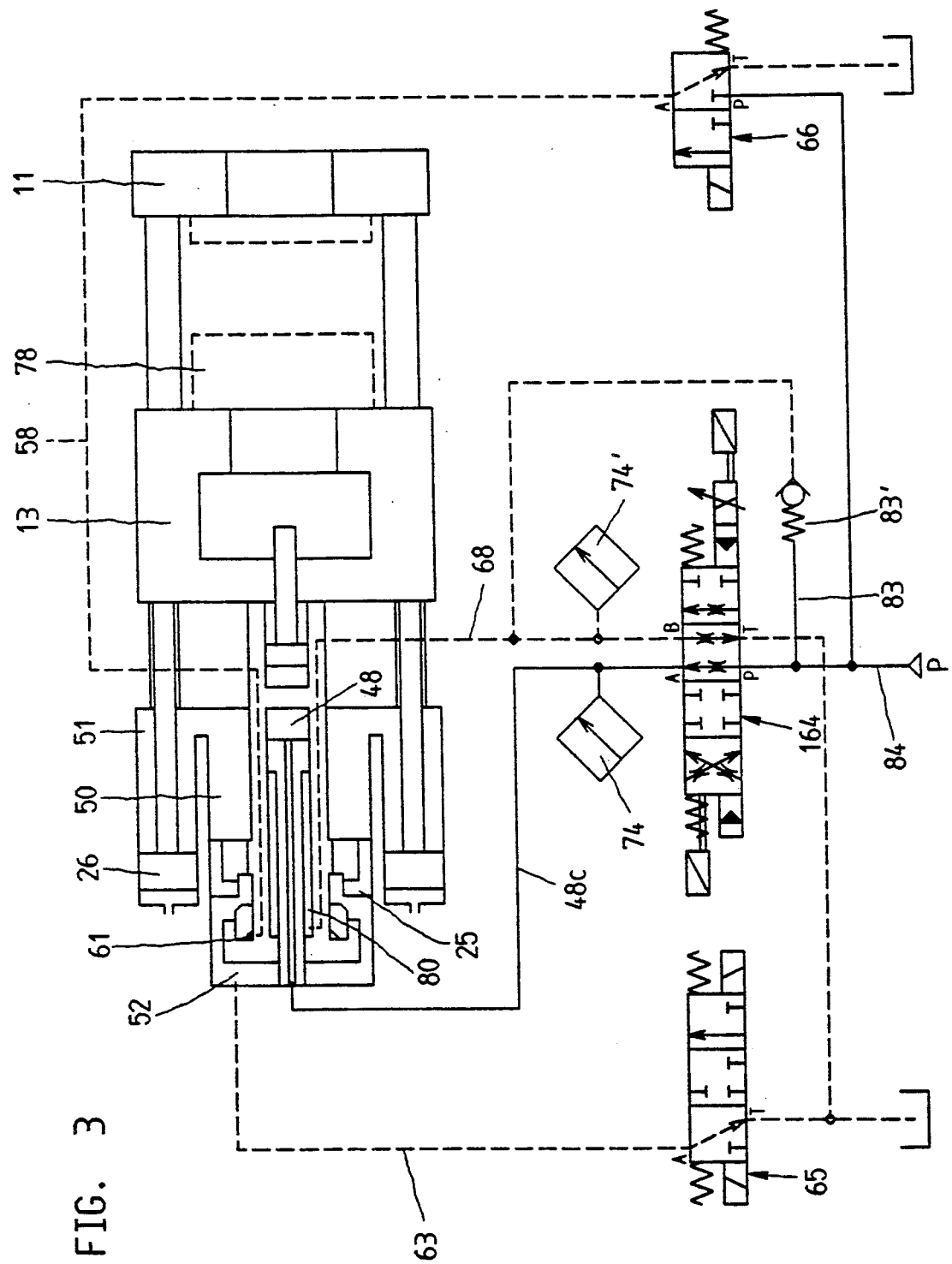
FIGS. 3 and 4 show the state of the hydraulic system during the mold-closing movement with and without a differential control of advance-retract cylinder
Figure 4:
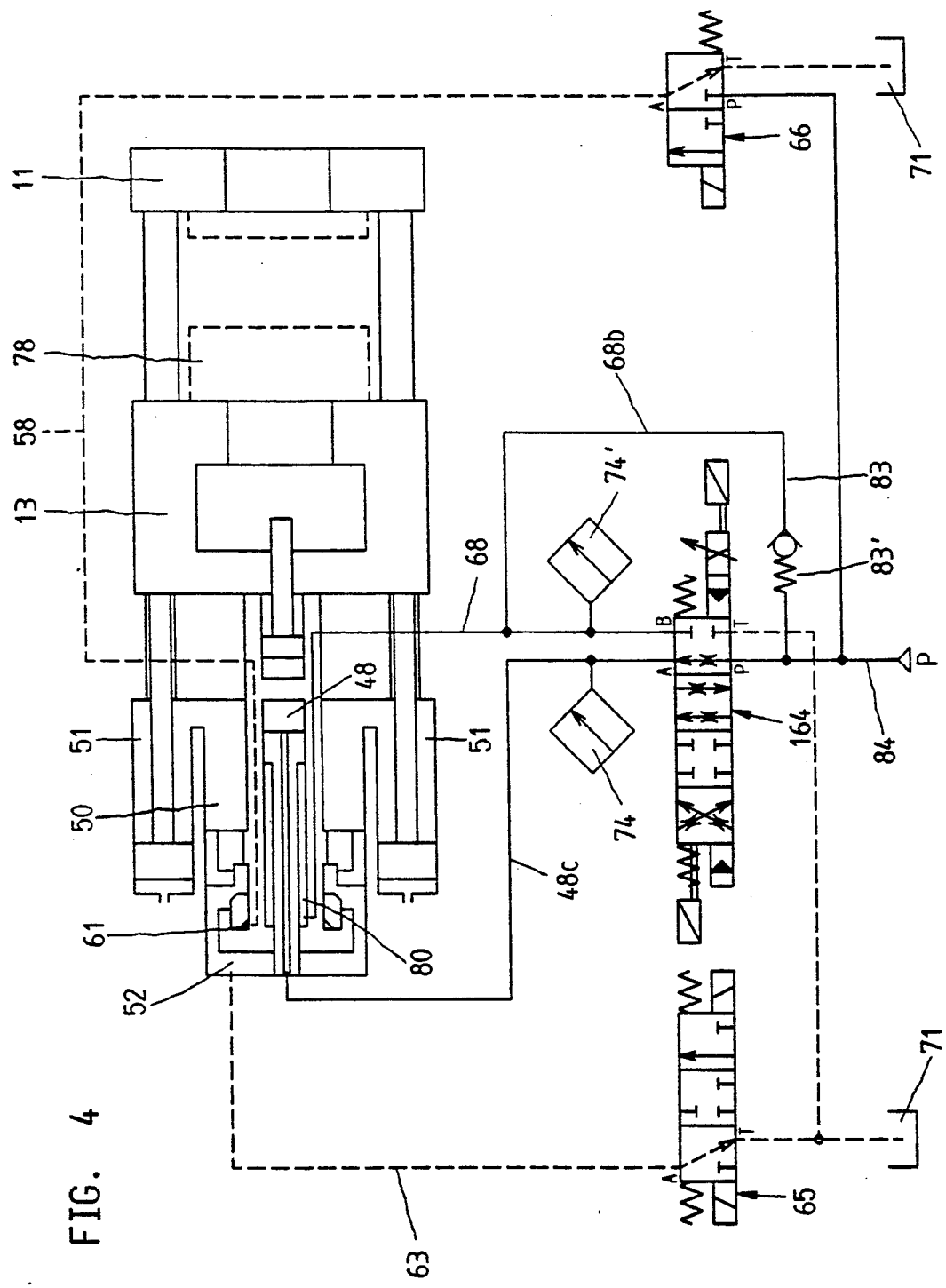

The hydraulic system has the following mode of operation: To initiate the mold-closing movement, the pressure is simultaneously controlled on opposite sides of the stationary differential piston 47b in the forward advance-retract cylinder and pressure fluid is supplied to said piston on one side thereof. As a result, the accelerating force can progressively be increased during that initial phase of the mold-closing movement until a predetermined desired velocity has been reached (control position shown in FIG. 3). As the 4/4-way valve 164 is moved further to the left in FIG. 3, a stepless change is effected from a direct application of fluid pressure to the piston 47b in the position shown in FIG. 3 to a differential control position, which is shown in FIG. 4. As that change from one position to the other is initiated by a corresponding movement of the spool of the 4/4-way valve the pressure fluid displaced out of the rear cylinder chamber 80 flows at a much higher rate via the flow path from port 'B' to port 'T' of the 4/4-way valve back to the reservoir 71 and said fluid flows at a lower rate from said rear cylinder chamber 80 through the non-return valve 83' to the pressure line 84 and further to the cylinder chamber 48. As the spool of the 4/4-way valve is displaced further toward the differential control position, in which the mold-closing movement is performed at a higher velocity, the rate at which pressure fluid is returned via the flow path from port 'B' to port 'T' of the 4/4-way valve progressively decreases and the rate at which pressure fluid flows through the non-return valve 83' into the pressure line 84 progressively increases. When the differential control position has been reached, all pressure fluid that is displaced out of the rear cylinder chamber 80 flows through the non-return valve 83' into the pressure line 84 and further to the flow path from port 'P' to port 'A' of the 4/4-way valve 164. This means that the full differential control position has now been reached in which the mold is closed at the highest possible velocity. It is emphasized that the movement of the 4/4-way valve to the left from its central position shown in FIGS. 1 and 2 to the differential control position shown in FIG. 4 may be steplessly performed as described hereinbefore or may be performed in several steps. If the change is effected in a single step this will take about 25 milliseconds so that the transitional control position which is shown in FIG. 3 and which is assumed before the mold-closing movement is initiated may be maintained only for an extremely short time amounting only to a few milliseconds, but may alternatively be prolonged.

Throughout the entire mold-closing and mold-opening movements the velocity control is combined with a superimposed automatic pressure control. When the pressure has reached the programmed value, pulse signals generated by the pressure sensors 74 and 74' initiate a change from the velocity control to an automatic pressure control.

As a rule, a major part of the mold-closing movement is performed while the 4/4-way valve is in its differential control position furthest to the left. In dependence on the required velocity control, the pressure fluid that is displaced from the cylinder chamber 80 of the advance-retract cylinder may be conducted during different periods of time to flow directly to the reservoir or to flow via the branch passage 68b; 83, which by-passes the 4/4-way valve and is provided with the non-return valve 83', into the pressure line 84 between the hydraulic pump P and the 4/4-way valve 164 while an automatic pressure control is effected by the pressure sensors 74 and 74'.

From the differential control position shown in FIG. 4 the 4/4-way valve can be moved back to the transitional control position, which is adjacent to the differential control position. In that transitional control position the fluid that is displaced from the cylinder chamber 80 is conducted through the valve passage 68 directly into the reservoir 71 under an automatic pressure control.

Figure 5:
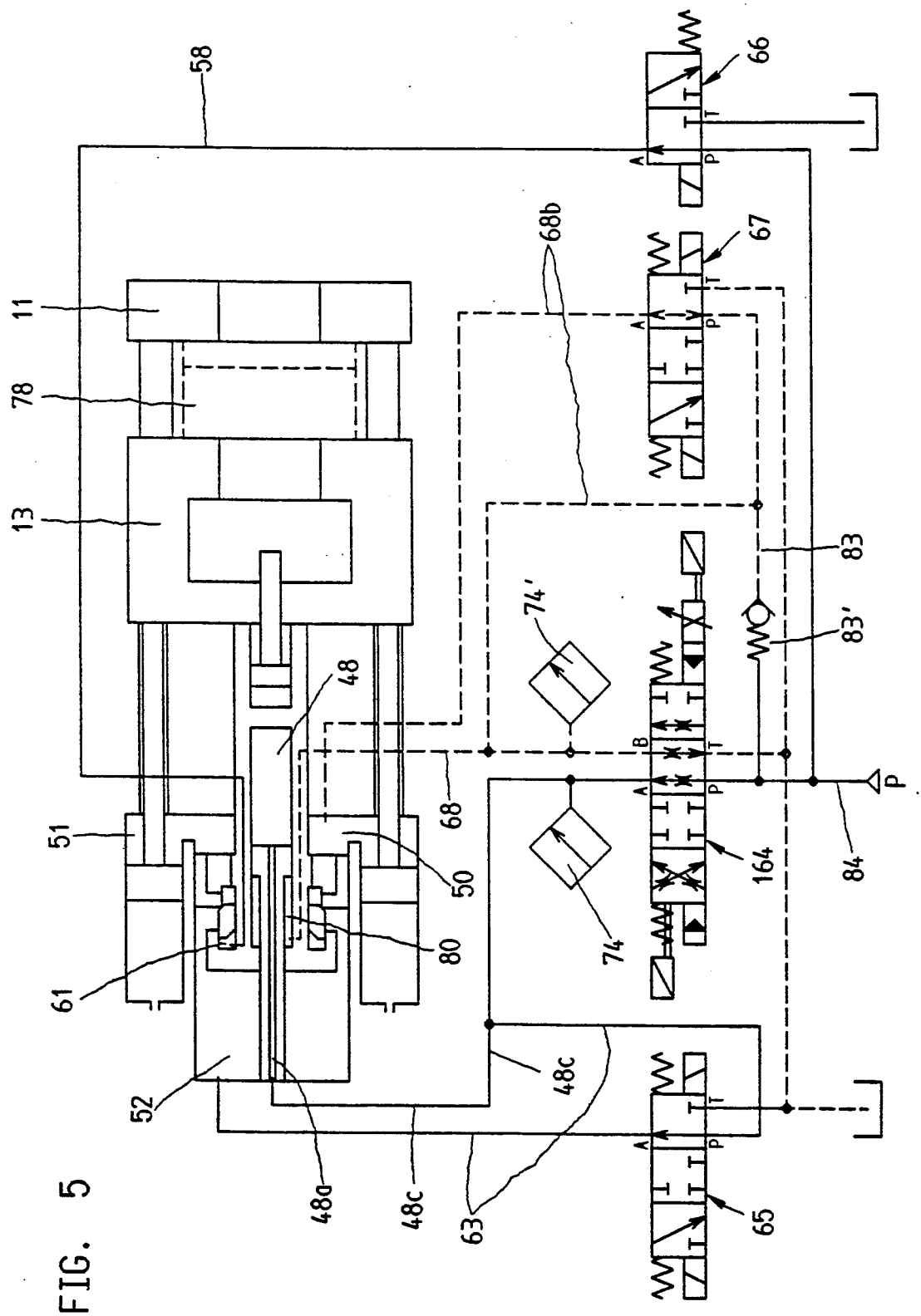
FIG. 5 shows how the injection mold is being closed toward the end of a final closing phase, which is assisted by the pressure in the high-pressure chamber.

During a final phase of the mold-closing movement the transitional control position shown in FIG. 3 may be maintained and the following connections may additionally be established:

The communicating passage 48c leading from the 4/4-way valve to the cylinder chamber 48 of the advance-retract cylinder is connected to the high-pressure chamber via the branch passage 63, which is controlled by the shut-off valve 65. The communicating passage 68 leading from the cylinder chamber 80 of the advance-retract cylinder to the reservoir 71 is connected to the low-pressure chamber 50 by the branch passage 68b, which is controlled by the shut-off valve 67 (FIG. 5). During that relatively slow final phase of the mold-closing movement, pressure fluid is supplied to the high-pressure chamber 52 while the transfer passages 42 in the piston 25 of the locking cylinder 20 are closed and oil at a high rate is returned from the low-pressure chamber 50 through the branch line 68b and the 4/4-way valve to the reservoir 71. Because that last phase is extremely short, this is not inconsistent with the principle that a highly predominant part of the pressure fluid remains in an internal circuit of the hydraulic system throughout the injection molding cycle and only a very small part of said fluid is returned to the reservoir; that return flow is desired for temperature compensation.

Figure 6:
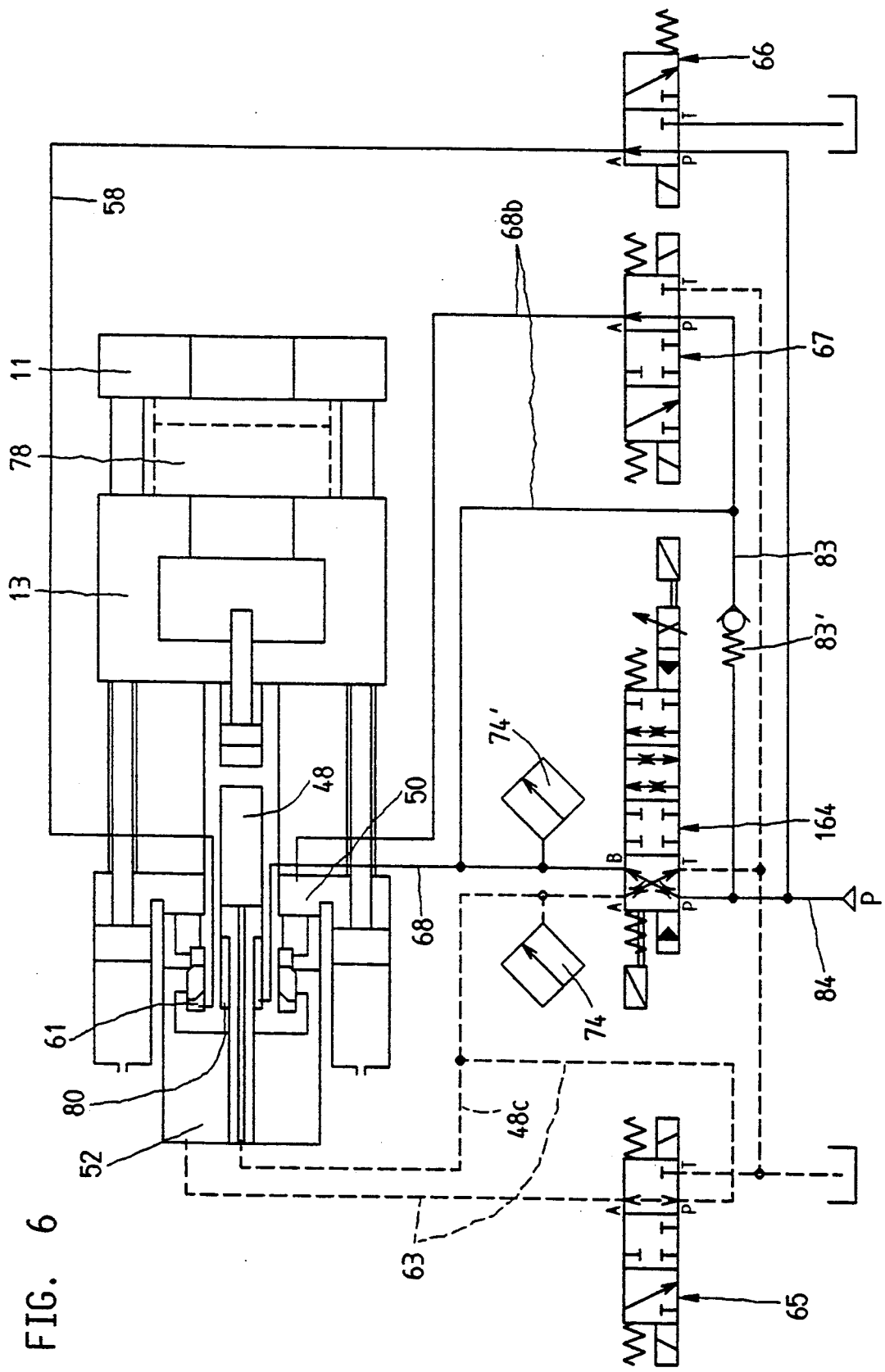
FIG. 6 illustrates the opening of the injection mold by a high mold-opening force.

If it is necessary to open the injection mold by a strong force, the 4/4-way valve is moved to its position farthest to the right, as is shown in FIG. 6. In that position the pressure fluid flows from the pump P through the pressure line 84 and the communicating passage 68 to the rear cylinder chamber 80 of the advance-retract cylinder and the communicating passage 68 communicates via the branch passage 68b, which is controlled by the shut-off valve 67, with the low-pressure chamber 50, which now acts as a high-pressure chamber. As a result, oil at a high rate is fed to the cylinder chamber 50 during that final phase and oil at the same rate is displaced out of the cylinder chamber 52. The thus displaced pressure fluid flows through the branch passage 63, which is controlled by the shut-off valve 65, into the communicating passage 48c and further through the 4/4-way valve into the reservoir 71. At the same time the pressure fluid which is displaced from the cylinder chamber 48 is returned to the reservoir 71 through the communicating passage 48c and the 4/4-way valve. The return of the pressure fluid from the cylinder chambers 48, 52 can be automatically controlled by the pressure sensors 74 and 74'. The further opening of the injection mold, the locking of the injection mold and the injection of the plastic material into the injection mold 78 may be effected in the manner which is known from DE 36 44 181 C1.

I claim:

1. In a combination of a clamping unit for use in an injection molding machine and a hydraulic system for actuating said clamping unit, wherein said clamping unit comprises a movable mold carrier for carrying a movable part of an injection mold, a hydraulic locking cylinder, which contains a locking piston, which defines in said locking cylinder a high-pressure chamber and a low-pressure chamber on opposite sides of said locking piston, wherein said locking piston is formed with transfer passage means, through which said high-pressure and low-pressure chambers are adapted to communicate with each other, at least one hydraulic advance-retract cylinder containing a stationary piston and connected to said movable mold carrier and adapted to impart to said movable mold carrier a mold-closing movement and a mold-opening movement to and from a mold-clamping position, respectively, wherein said locking piston is connected by a first piston rod to said movable mold carrier and is adapted to lock said movable mold carrier in said mold-clamping position under a fluid pressure in said high-pressure chamber, and said stationary piston defines in said advance-retract cylinder on opposite sides of said stationary piston a first cylinder chamber, which is nearer to said movable mold carrier, and a second cylinder chamber, which is remote from said movable mold carrier, and at least one compensating cylinder containing a compensating piston, which defines in said compensating cylinder a compensating cylinder chamber communicating with said low-pressure chamber and is connected by a second piston rod to said movable mold carrier, and said hydraulic system comprises a hydraulic pump, a pressure line connected to said pump, a reservoir, a return line connected to said reservoir, transfer valve means controlling the communication between said high-pressure and low-pressure chambers through said transfer passage means, a first communicating passage connected to said first cylinder chamber, a second communicating passage connected to said second cylinder chamber, a first branch passage connecting said first communicating passage to said high-pressure chamber, a second branch passage connecting said second cylinder chamber to said low-pressure chamber, first and second shut-off valves controlling said first and second branch passages, and control means including means for controlling the flow of pressure fluid to and from said first and second cylinder chambers in dependence on a fluid flow volume program and means for a superimposed control of the fluid pressure in said first and second cylinder chambers, which control means include a pressure sensor in each of said communicating passages, a displacement-voltage converter, which is responsive to the movement of said advance-retract cylinder relative to said stationary piston, and a directional control valve for controlling the communication between said first and second cylinder chambers and said pressure line and said reservoir line, in dependence on said pressure sensors and said displacement-voltage converter, the improvement residing in that said hydraulic system comprises a third branch passage, which by-passes said directional control valve and connects said second cylinder chamber to said pressure line and includes a non-return valve permitting a flow from said second cylinder chamber to said pressure line, and said directional control valve consists of a 4/4-way valve for controlling the velocity of said mold-closing movement and the pressure in said first and second cylinder chambers and is adapted to assume during a major part of said mold-closing movement a differential control position, in which the 4/4-way valve connects said second cylinder chamber to said third branch passage, and to assume before and after said differential control position a transitional control position, in which said 4/4-way valve connects said second cylinder chamber to said return line, and to connect said pressure line to said first cylinder chamber in said differential and transitional control positions.

2. The improvement set forth in claim 1, wherein said control means are operable during a final part of said mold-closing movement to open said first and second shut-off valves while said 4/4-way valve is in said transitional control position.

3. The improvement set forth in claim 1, wherein said 4/4-way valve is adapted to assume a mold-opening position, in which said first communicating passage is connected by said 4/4-way valve to said return line and said control means are adapted to open said first valve during an initial part of said mold-opening movement.

4. The improvement set forth in claim 1, wherein said 4/4-way valve is a proportional-action valve having a zero overlap and is arranged to effect a stepless change of the flow areas during a movement of said 4/4-way valve between said differential and transitional control positions.

5. The improvement set forth in claim 1, wherein said clamping unit comprises a central advance-retract cylinder, a single locking cylinder, which is coaxial to said advance-retract cylinder, and two compensating cylinders, which are diametrically opposite to each other and disposed on opposite sides of said locking cylinder.

6. The improvement set forth in claim 1, wherein said clamping unit comprises a central advance-retract cylinder, a single compensating cylinder, which is coaxial to said advance-retract cylinder, and two locking cylinders, which are diametrically opposite to each other and disposed on opposite sides of said compensating cylinder.

* * * * *